US007443852B2

(12) United States Patent
Kwon et al.

(10) Patent No.: US 7,443,852 B2
(45) Date of Patent: Oct. 28, 2008

(54) INTERNET BROADCASTING SYSTEM AND METHOD THEREOF

(75) Inventors: Jeong-Gook Kwon, Daejon (KR); Kyeong-Seob Cho, Daejon (KR); Jea-Hoon Yu, Daejon (KR); Bong-Tae Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 658 days.

(21) Appl. No.: 11/176,902

(22) Filed: Jul. 7, 2005

(65) Prior Publication Data

US 2006/0126668 A1    Jun. 15, 2006

(30) Foreign Application Priority Data

Dec. 13, 2004    (KR) .................. 10-2004-0105043

(51) Int. Cl.
*H04L 12/56*    (2006.01)
(52) U.S. Cl. .................. 370/390; 370/392; 709/203
(58) Field of Classification Search .............. 370/390, 370/392; 709/203
See application file for complete search history.

(56) References Cited

U.S. PATENT DOCUMENTS

| 6,351,467 | B1 | 2/2002 | Dillon | |
|---|---|---|---|---|
| 6,564,262 | B1 | 5/2003 | Chaddha | |
| 6,826,176 | B1 * | 11/2004 | Siddiqui et al. | 370/352 |
| 2004/0133669 | A1 * | 7/2004 | Jalonen et al. | 709/224 |
| 2005/0122976 | A1 * | 6/2005 | Poli et al. | 370/392 |
| 2005/0152296 | A1 * | 7/2005 | Lee et al. | 370/312 |

FOREIGN PATENT DOCUMENTS

| KR | 20010076596 | 8/2001 |
|---|---|---|
| KR | 10-2002-0046030 | 6/2002 |
| KR | 100387048 | 5/2003 |
| KR | 10-2003-0091666 | 12/2003 |

OTHER PUBLICATIONS

'A Study on Performance Evaluation of Tree Creation in Tree-based Multicasting Protocol' Kim et al., Dept. of Computer Science, Yonsei University, Electronics and Telecommunications Research Institute.
'A Simple Hierarchical Approach to Intra/Inter Domain Multicasting' Chen et al., SPIE vol. 3231, pp. 102-112.

* cited by examiner

*Primary Examiner*—Melvin Marcelo
(74) *Attorney, Agent, or Firm*—Ladas & Parry LLP

(57) ABSTRACT

An Internet broadcasting system and a method thereof are provided. The Internet broadcasting system includes: a signal converter for converting a received analog broadcasting signal into a digital broadcasting data; an Internet broadcasting unit for storing and sending the digital broadcasting data; a repeater for relaying the digital broadcasting data to a switching unit connected with a terminal according to a broadcasting request message inputted from the terminal but selectively relaying a channel selected by the terminal by referring to a first multicasting forwarding table created by using a UDP port number extracted from the broadcasting request message; and the switching unit for snooping on the broadcasting request message, extracting the UDP port number, storing the extracted UDP port number into a second multicasting forwarding table, and transmitting the digital broadcasting data of the selected channel to the corresponding terminal referring to an entry of the second multicasting forwarding table.

9 Claims, 5 Drawing Sheets

FIG. 6

| 61 | 62 | 63 | 64 | 65 |
|---|---|---|---|---|
| MULTICASTING GROUP MAC ADDRESS | SOURCE MAC ADDRESS | SOURCE IP ADDRESS | IP MULTICASTING GROUP ADDRESS | UDP PORT NUMBER |

FIG. 7

| 71 | 72 | 73 |
|---|---|---|
| MULTICASTING GROUP MAC ADDRESS | UDP PORT NUMBER OF SOURCE | PHYSICAL PORT NUMBER OF IGMP SWITCH |

FIG. 8

| 81 | 82 | 83 | 84 |
|---|---|---|---|
| MULTICASTING GROUP MAC ADDRESS | UDP PORT NUMBER OF SOURCE | PHYSICAL PORT NUMBER OF SOURCE | SOURCE IP ADDRESS |

INTERNET BROADCASTING SYSTEM AND METHOD THEREOF

FIELD OF THE INVENTION

The present invention relates to an Internet broadcasting system and a method thereof; and, more particularly, to an Internet broadcasting system with reduced network loads and increased bandwidth by selectively transmitting a channel requested by a user terminal through using a router and a switch for routing and switching a broadcasting signal to the user terminal and a method thereof.

DESCRIPTION OF THE RELATED ART

A conventional Internet broadcasting system provides high-capacity broadcasting contents to a plurality of user terminals by employing an Internet protocol (IP) multicasting method. Especially, the IP multicasting method sets a specific Internet address in a region of "Class D" as a multicasting address for use in IP broadcasting specified by an international standardization association and enables simultaneous transmission of data, sent from a specific terminal sharing the Internet address of the "Class D" region, to all terminals sharing the Internet address of the "Class D" region.

That is, when the same data is transmitted to many terminals, a typical transmission control protocol (TCP)/Internet protocol (IP) or user datagram protocol (UDP) has to transmit the same data repeatedly as many as the number of the terminals. However, the IP multicasting method transmits the data simultaneously to a number of terminals without repeatedly transmitting the data. Thus, the IP multicasting method is frequently employed for Internet broadcasting because of the provided capability in reducing communication loads to servers and network devices.

Meanwhile, the IP multicasting method requires a multicasting address for use in IP broadcasting allocated from an IP address management agency. It is generally difficult for an Internet broadcasting service provider to be allocated with a number of multicasting addresses for use in IP broadcasting. Hence, it may also be difficult to allocate the multicasting address for use in IP broadcasting for each channel provided by the Internet broadcasting service provider. Also, even though such multicasting address is allocated for each channel, thereby providing an effect of distinguishing the channels from each other, there may be still a problem of using many IP addresses.

For this reason, most Internet broadcasting service providers use a transmission method of sending contents by distinguishing one multicasting address for each channel depending on a UDP port. With reference to FIG. 1, the conventional Internet broadcasting system will be described in detail.

FIG. 1 is a configuration diagram showing a conventional Internet broadcasting system.

As shown, the conventional Internet broadcasting system includes: an IPTV head end 11 for converting a received cable broadcasting or terrestrial broadcasting signal into a digital signal; an Internet broadcasting server 12 for sending broadcasting data stored into a recording medium such as a disk; a first to a third IP multicasting routers 13 to 15 for relaying the received broadcasting data from the Internet broadcasting server 12 by using UDP/IP; and a plurality of first to a fifth Internet group management protocol (IGMP)-snooping switches 16 to 20 for transporting the broadcasting data received from the first to the third IP multicasting routers 13 to 15 to respective terminals.

Instead of sending the broadcasting data by distinguishing broadcasting channels based on multicasting addresses, the Internet broadcasting server 12 sends the broadcasting data by distinguishing the broadcasting channels based on UDP port numbers. Thus, even if a specific terminal user makes a request to watch a specific broadcasting channel, the first to the third IP multicasting routers 13 to 15 and the first to the fifth IGMP-snooping switches 16 to 20 transmit broadcasting contents of the channel requested by the terminal user as well as those sent by the Internet broadcasting server 12 to the selected terminal since the first to the third IP multicasting routers 13 to 15 and the first to the fifth IGMP-snooping switches 16 to 20 are not capable of distinguishing the broadcasting channels from each other.

For instance, in the case of simultaneously sending a first to a third channels each with 20 Mbps along with allocated IP addresses of '224.7.0.1', '224.7.0.2' and '224.7.0.3', respectively, the first IP multicasting router 13 sends 60 Mbps of data of the above three channels to each of the second and the third IP multicasting routers 14 and 15, which are sub-routers connected with the first IP multicasting router 13. Each of the second and the third IP multicasting routers 14 and 15 sends the 60 Mbps of data simultaneously to the first to the fifth IGMP-snooping switches 16 to 20.

Hereinafter, a head structure of a conventional IGMP message will be reviewed in detail with reference to FIG. 2.

FIG. 2 is a configuration diagram showing one exemplary head included into a conventional IGMP message.

The head included into the IGMP message includes: a multicasting group media access control (MAC) address 21; a source MAC address 22; a source IP address 23; and an IP multicasting group address 24.

At this time, the multicasting group MAC address 21 is a group identifier of Internet broadcasting to be watched by a specific terminal user. The first to the fifth IGMP-snooping switches 16 to 20 search for a corresponding entry from a multicasting forwarding table managed individually by the first to the fifth IGMP-snooping switches 16 to 20 to match the multicasting group MAC address 21 with a physical port depending on a type of an IGMP message or to delete the discovered corresponding entry from the multicasting forwarding table.

The multicasting forwarding table managed by each of the first to the fifth IGMP-snooping switches 16 to 20, as shown in FIG. 3, includes: a multicasting group MAC address 31; and a physical port number 32 of the selected IGMP switch 16, 17, 18, 19 or 20. The first to the fifth IGMP-snooping switches 16 to 20 capture the IGMP messages communicated between each of the terminals and each of the first to the third IP multicasting routers 13 to 15 and analyze the IGMP messages. Also, the first to the fifth IGMP-snooping switches 16 to 20 construct the multicasting forward tables and transmit the same broadcasting data/contents simultaneously to the terminals included into the same multicasting group with regardless of the specifically requested channel.

The source MAC address 22 is an identifier for a second layer address assigned to all frames transmitted by the terminal. The source IP address 23 is an identifier for an IP address used when the terminal uses the Internet. The IP multicasting group address 24 is an identifier for an Internet broadcasting multicasting address set by an international standardization association.

The first to the third IP multicasting routers 13 to 15 add the IP multicasting group address 24 to each of the multicasting forwarding tables managed individually by the first to the third IP multicasting routers 13 to 15 to simultaneously transmit the received Internet broadcasting data/contents from a server that uses the same IP multicasting group address 24 to all destinations that belong to a multicasting tree. At this time, the individual multicasting forwarding table managed by each of the first to the third multicasting routers 13 to 15 is shown in FIG. 4. Specifically, the multicasting forwarding table includes: a multicasting group MAC address 41 for identifying a multicasting address for use in Internet broadcasting; a physical port number 42 of a source necessary for sending the broadcasting data/contents received from the Internet broadcasting server 12 or the first IP multicasting router 13 to the terminals; and a source IP address 43.

At this time, the first IP multicasting router 13 constructs the multicasting forwarding table according to an adjacent router and a multicasting protocol or according to the IGMP message sent by the terminal and, transmits the broadcasting data received from the Internet broadcasting server 12 simultaneously to the broadcasting receiving group according to the entry of the constructed multicasting forwarding table. Meanwhile, upon a request from the terminal, the second and the third IP multicasting routers 14 and 15 add and delete the entry of the individual multicasting forwarding table managed by each of the second and the third IP multicasting routers 14 and 15.

As described above, the first to the third IP multicasting routers 13 to 15 and the first to the fifth IGMP-snooping switches 16 to 20 cannot distinguish the broadcasting channels individually and thus, sending the same broadcasting data/contents to the terminals of the multicasting group. Hence, each of the terminals also receives a large amount of broadcasting data/contents in addition to a specifically desired broadcasting data/content.

Accordingly, the conventional Internet broadcasting method results in heavy loads to a network, thereby causing several problems such as incapability in accessing to and communicating with the terminal, a data loss, a reduction in communication speed, a terminal disconnection. For instance, assuming that network processing capability of the terminal is 100 Mbps and the Internet broadcasting server 12 sends more than 5 high-quality broadcasting channels with 20 Mbps, the terminal may still have an operation difficulty due to an unnecessary traffic even though the terminal can process the corresponding broadcasting channel.

SUMMARY OF THE INVENTION

It is, therefore, an object of the present invention to provide an Internet broadcasting system with decreased network loads and increased bandwidth by selectively transmitting a specifically requested broadcasting channel through using a router or switch for relaying or switching a broadcasting signal to a user terminal and a method thereof.

In accordance with an aspect of the present invention, there is provided an Internet broadcasting system, including: a signal converter for receiving an analog broadcasting signal and converting the analog broadcasting signal into a digital broadcasting data; an Internet broadcasting unit for sending the digital broadcasting data after storing the digital broadcasting data; a repeater for relaying the digital broadcasting data to a switching unit connected with a user terminal according to a broadcasting request message inputted from the user terminal but selectively relaying a channel selected by the user terminal by referring to a first multicasting forwarding table created by using a user datagram protocol (UDP) port number extracted from the broadcasting request message; and the switching unit for snooping on the broadcasting request message transmitted from the user terminal to the repeater, extracting the UDP port number from the broadcasting request message, storing the extracted UDP port number into a second multicasting forwarding table such that the extracted UDP port number corresponds to information on a location of the user terminal, and transmitting the digital broadcasting data of the selected channel received from the repeater to the corresponding user terminal by referring to an entry of the second multicasting forwarding table.

In accordance with another aspect of the present invention, there is provided a method for providing an Internet broadcasting service, including the steps of: storing a UDP port number extracted from a broadcasting request message inputted from a user terminal into a multicasting forwarding table such that the extracted UDP port number corresponds to information on a location of the user terminal; and selectively transmitting a broadcasting data corresponding to a channel selected by the user terminal among broadcasting data of multiple channels received from an external source by referring to the multicasting forwarding table based on the broadcasting request message inputted from the user terminal.

BRIEF DESCRIPTION OF THE DRAWINGS

The above and other objects and features of the present invention will become apparent from the following description of the preferred embodiments given in conjunction with the accompanying drawings, in which:

FIG. 6 is a configuration diagram showing one embodied head included into an IGMP message in accordance with the present invention;

FIG. 7 is a configuration diagram showing one embodied multicasting forwarding table managed by an IGMP-snooping switch in accordance with the present invention;

FIG. 8 is a configuration diagram showing one embodied multicasting forwarding table managed by an IP multicasting router in accordance with the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
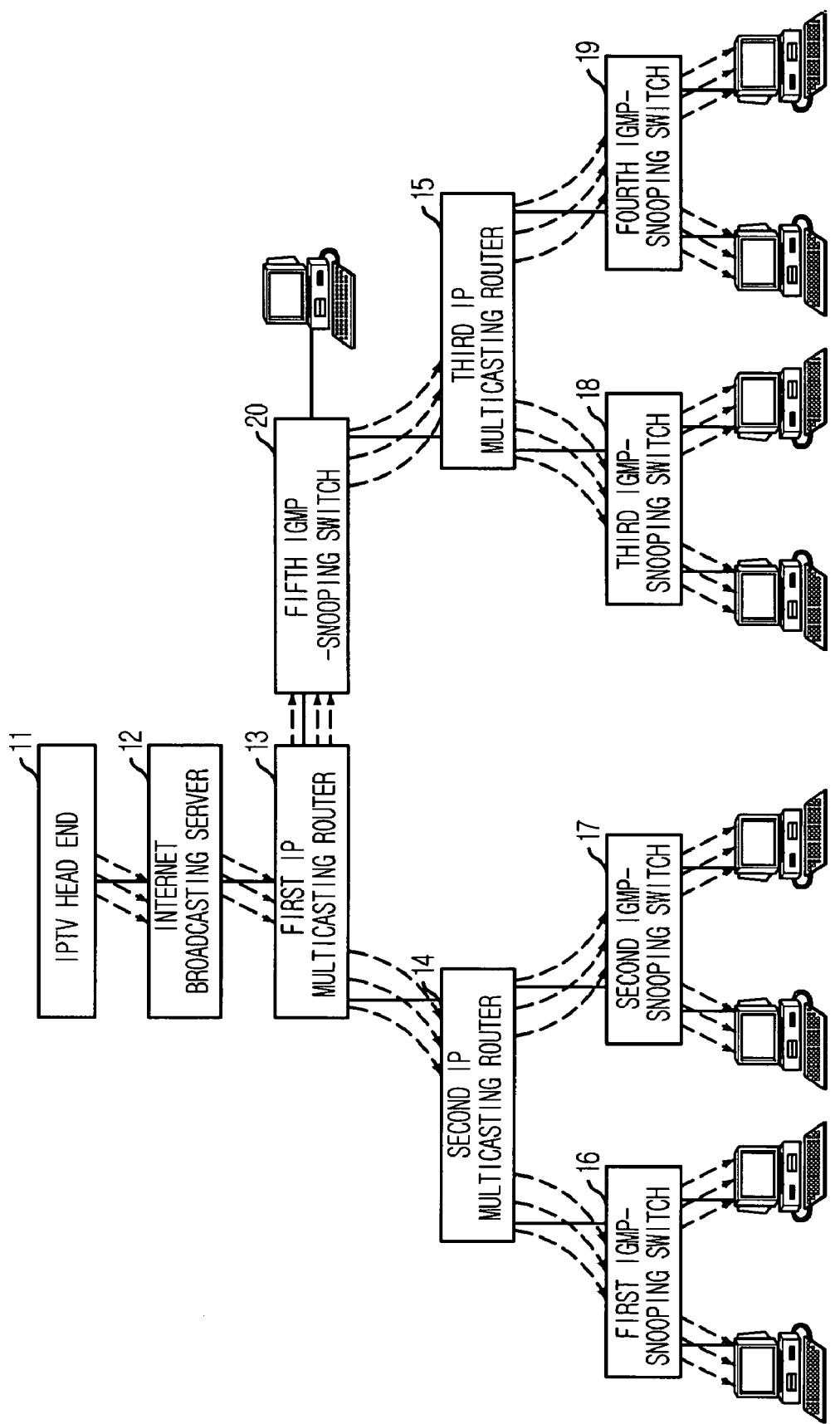
FIG. 1 is a configuration diagram showing a conventional Internet broadcasting system.
Figure 2:
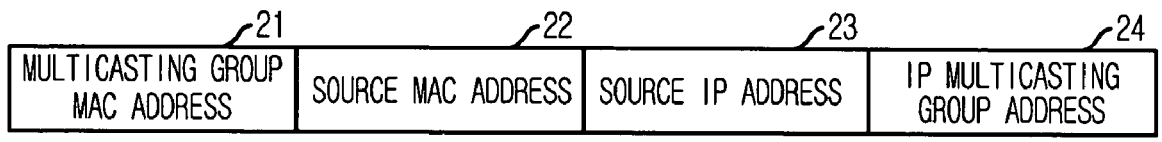
FIG. 2 is a configuration diagram showing a head included into a conventional IGMP message.
Figure 3:
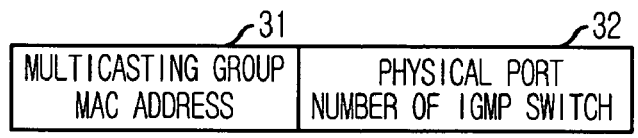
FIG. 3 is a configuration diagram showing one exemplary multicasting forwarding table managed by a conventional IGMP-snooping switch.
Figure 4:
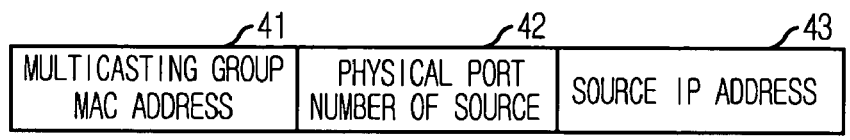
FIG. 4 is a configuration diagram showing one exemplary multicasting forwarding table managed by a conventional IP multicasting router.
Figure 5:
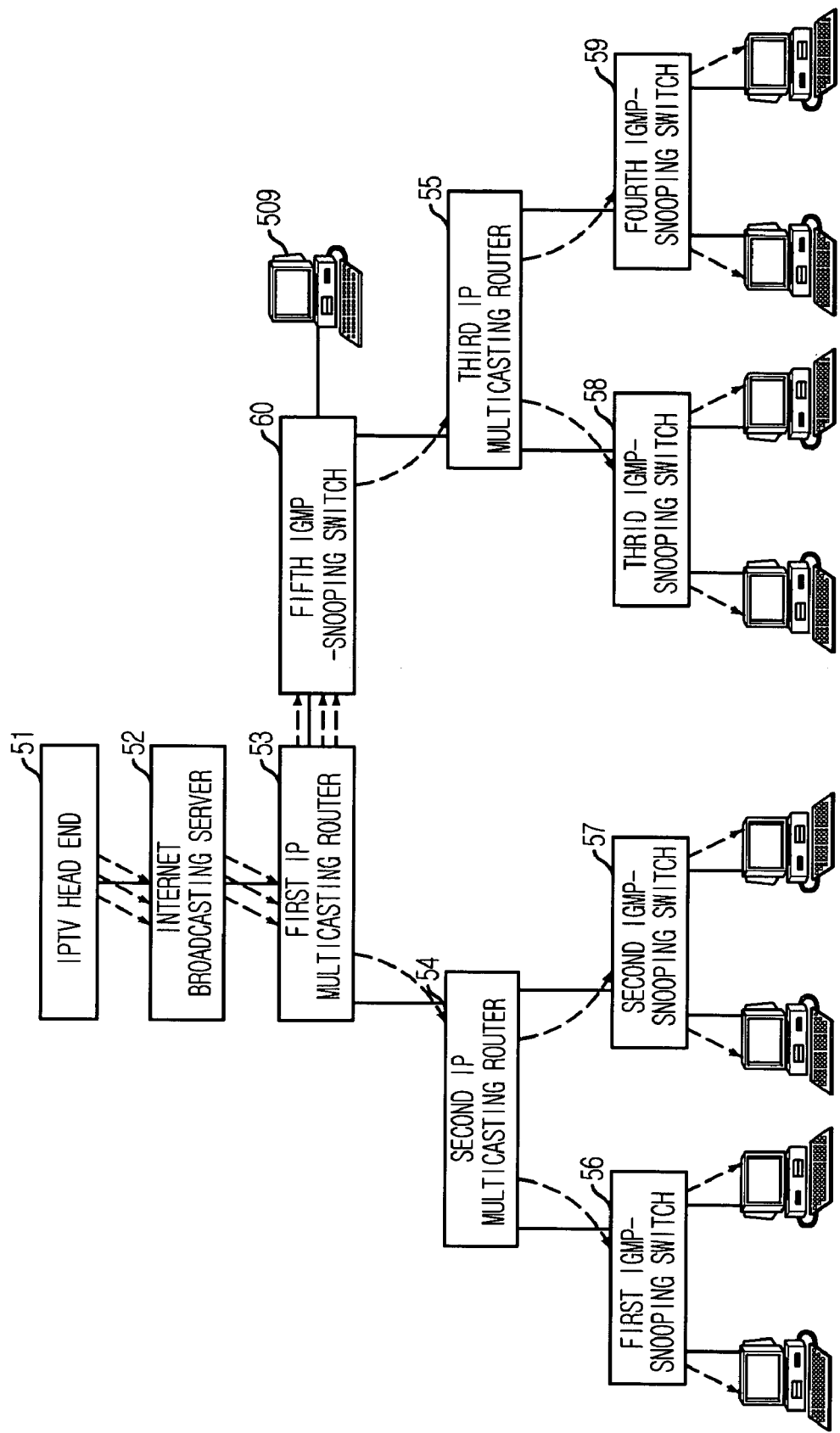
FIG. 5 is a configuration diagram showing an Internet broadcasting system in accordance with the present invention.

FIG. 5 is a configuration diagram showing one embodied Internet broadcasting system in accordance with the present invention.

As shown, the Internet broadcasting system includes: an IPTV head end 51; an Internet broadcasting server 52; a first to a third IP multicasting routers 53 to 55; and a first to a fifth IGMP-snooping switches 56 to 60. The IPTV head end 51 receives a cable broadcasting or terrestrial broadcasting signal and converts the received cable broadcasting or terrestrial broadcasting signal into a digital broadcasting signal. The Internet broadcasting server 52 stores the digital broadcasting signal into a recording medium and sending the stored digital broadcasting signal. The first to the third IP multicasting routers 53 to 55 relay the received broadcasting data, i.e., the digital broadcasting signal, from the Internet broadcasting server 52 to the first to fifth IGMP-snooping switches 56 to 60 according to a broadcasting request message inputted from one of a first to a ninth terminals 501 to 509 but selectively relay a channel selected by said one of the first to the ninth terminals 501 to 509 by using an UDP port number extracted from the broadcasting request message. The first to the fifth IGMP-snooping switches 56 to 60 snoop on the broadcasting request message transmitted from said one of the first to the ninth terminals 501 to 509 to the first to the third IP multicasting routers 53 to 55 and, extract the UDP port number included in the broadcasting request message and store the extracted UDP port number into a multicasting forwarding table such that the extracted UDP port number corresponds to information on a location of said one of the first to the ninth terminals 501 to 509. Afterwards, by referring to the entry of the multicasting forwarding table, the first to the fifth IGMP-snooping switches 56 to 60 transmit the broadcasting data of the specific channel received from the first to the third IP multicasting routers 53 to 55 to the corresponding user terminal, i.e., said one of the first to the fifth terminals 501 to 509.

Each of the first to the third IP multicasting routers 53 to 55 manages the individual multicasting forwarding table including the UDP port number (refer to FIG. 8). Also, the first to the third IP multicasting routers 53 to 55 extract a multicasting group IP address and an UDP port number included in a head of a broadcasting data message received from the Internet broadcasting server 52 and then, search for the individual multicasting forwarding table managed by each of the first to the third IP multicasting routers 53 to 55. If the extracted UDP port number coincides with the UDP port number of the individual multicasting forwarding table managed by each of the first to the third IP multicasting routers 53 to 55, the UDP port number is transmitted to the sub-IP multicasting routers, in this case, the second and the third IP multicasting routers 54 and 55 or the first to the fifth IGMP-snooping switches 56 to 60. If otherwise, the UDP number is not transmitted thereto.

FIG. 6 shows one embodied structure of a head of a broadcasting data message in accordance with the present invention.

As shown, the head of the broadcasting data message includes: a multicasting group MAC address 61; a source MAC address 62; a source IP address 63; an IP multicasting group address 64; and an UDP port number 65.

The multicasting group MAC address 61 is a group identifier of Internet broadcasting requested by a user terminal, in this case, one of the first to the ninth terminals 501 to 509. The first to the fifth IGMP-snooping switches 56 to 60 search for the corresponding entry of the individual multicasting forwarding table managed by each of the first to fifth IGMP-snooping switches 56 to 60 to map the multicasting group MAC address 61 depending on a type of an IGMP message with a physical port or to delete the discovered corresponding entry from the individual multicasting forwarding table managed by each of the first to the fifth IGMP-snooping switches 56 to 60.

The individual multicasting forwarding table managed by each of the first to the fifth IGMP-snooping switches 56 to 60 includes: a multicasting group MAC address 71; an UDP port number 72 of a source; and a physical port number of the respective IGMP switch 56, 57, 58, 59, or 60. This configuration of the multicasting forwarding table is illustrated in FIG. 7. The first to the fifth IGMP-snooping switches 56 to 60 capture and analyze the IGMP messages communicated between each of the first to the ninth user terminals 501 to 509 and each of the first to the third IP multicasting routers 53 to 55 and construct the respective multicasting forward tables. Also, the first to the fifth IGMP-snooping switches 56 to 60 store the UDP port number 72 as an identifier for the broadcasting channel requested by one of the first to the ninth terminals 501 to 509.

The source MAC address 62 is an identifier for a second layer address allocated to all frames transmitted by one of the first to the ninth terminals 501 to 509. The source IP address 63 is an identifier for an IP address used when said one of the first to the ninth terminals 501 to 509 utilizes the Internet. The IP multicasting group address 64 is an identifier for a multicasting address for use in Internet broadcasting set by an international standardization association.

Especially, the first to the third IP multicasting routers 53 to 55 add the IP multicasting group address 64 to the respective multicasting forwarding tables managed individually by the first to the third IP multicasting routers 53 to 55 to simultaneously transmit Internet broadcasting contents received from a server that uses the same IP multicasting group address 64 to all destinations that belong to a multicasting tree.

At this time, as shown in FIG. 8, the individual multicasting forwarding table managed by each of the first to the third IP multicasting routers 53 to 55 includes: a multicasting group MAC address 81 for identifying a multicasting address for use in Internet broadcasting; an UDP port number 82 of a source; a physical port number 83 of the source necessary for sending the received broadcasting data from the Internet broadcasting server 52 or the first IP multicasting router 53 to a terminal side; and a source IP address 84.

Each of the first to the third IP multicasting routers 53 to 55 constructs the multicasting forwarding table according to an adjacent IP multicasting router 53, 54 or 55 and a multicasting protocol or according to the IGMP message received from one of the first to the ninth terminals 501 to 509. Also, the first to the third IP multicasting routers 53 to 55 extract the multicasting group address, included in the broadcasting data message received from the Internet broadcasting server 52 or the head of the broadcasting data message received from the adjacent IP multicasting router 53, 54 or 55, and the UDP port number corresponding to the broadcasting channel requested by one of the first to the ninth terminals 501 to 509. If the extracted multicasting group address and UDP port number are identical to the entry of the multicasting forwarding table managed by each of the first to the third IP multicasting routers 53 to 55, the extracted multicasting group address and UDP port number are transmitted to the first to the fifth IGMP-snooping switches 56 to 60. If otherwise, the transmission of the extracted multicasting group address and UDP port number does not take place.

As described above, the first to the fifth IGMP-snooping switches 56 to 60 capture and analyze the IGMP messages communicated between each of the first to the ninth terminals 501 to 509 and each of the first to the third IP multicasting routers 53 to 55 and then, construct the respective multicasting forwarding tables. Also, the first to the fifth IGMP-snooping switches 56 to 60 transmit the broadcasting data received from the first to the third IP multicasting routers 53 to 55 to one of the first to the ninth terminals 501 to 509 but extract the multicasting group address included in the head of the broadcasting data message and the UDP port number corresponding to the requested broadcasting channel.

Also, if the extracted multicasting group address and UDP port number coincide with the entry of the individual multicasting forwarding table managed by each of the first to the fifth IGMP-snooping switches 56 to 60, the first to the fifth IGMP-snooping switches 56 to 60 transmit the extracted multicasting group address and UDP port number to the corresponding terminal, i.e., one of the first to the ninth terminals 501 to 509. If otherwise, the extracted multicasting address and UDP port number are not transmitted. At this time, upon the request by one of the first to the ninth terminals 501 to 509, the first to the third IP multicasting routers 53 to 55 can freely add and delete the entry of the individual multicasting forwarding table managed by each of the first to the third IP multicasting routers 53 to 55.

For instance, the Internet broadcasting server 52 sends simultaneously three broadcasting channels each with approximately 20 Mbps. Herein, the three broadcasting channels are assumed to be 'KBS', 'MBC' and 'SBS' allocated with addresses of 224.7.0.1, 224.7.0.2 and 224.7.0.3, respectively. If the first to the third terminals 501 to 503 request the broadcasting channel of 'KBS', the fifth to the seventh terminals 505 to 507 request the broadcasting channel of 'MBC', and the ninth terminal 509 requests the broadcasting channel of 'SBS', the first IP multicasting router 53 transmits the broadcasting signal for 'KBS' and the broadcasting signal for 'MBC' each with approximately 20 Mbps to the second and the third IP multicasting routers 54 and 55, while the first IP multicasting router 53 transmits approximately 20 Mbps of the broadcasting signal for 'SBS' to the fifth IGMP-snooping switch 60 connected to the ninth terminal 509.

Then, the second and the third IP multicasting routers 54 and 55 transmit the broadcasting signal of 'KBS' to the first to the second IGMP-snooping switches 56 and 57 connected to the first to the third terminals 501 to 503 and the broadcasting signal of 'MBC' to the third and the fourth IGMP-snooping switches 58 and 59 connected to the fifth to the seventh terminals 505 and 507.

Afterwards, the first IGMP-snooping switch 56 connected to the first and the second terminals 501 and 502 transmits approximately 20 Mbps of the broadcasting signal of 'KBS' to the first and the second terminals 501 and 502, and the second IGMP-snooping switch 57 connected to the third and the fourth terminals 503 and 504 transmits approximately 20 Mbps of the broadcasting signal of 'MBC' to the third terminal 503. The third IGMP-snooping switch 58, connected to the fifth and the sixth terminals 505 and 506, transmits approximately 20 Mbps of the broadcasting signal of 'MBC' to the fifth and the sixth terminals 505 and 506. Also, the fourth IGMP-snooping switch 59, connected to the seventh and the eighth terminals 507 and 508, transmits approximately 20 Mbps of the broadcasting signal of 'MBC' to the seventh terminal 507.

As described above, by transmitting the broadcasting signal requested by the terminal, it is possible to reduce network loads to those network devices of the Internet broadcasting system, i.e., the first to the third IP multicasting routers 53 to 55 and the first to the fifth IGMP-snooping switches 56 to 60 and to decrease an incidence of a bottle neck effect at those network devices. Also, since the terminal does not receive unnecessary data due to the selective receiving of the desired broadcasting signal, the terminal is provided with an improved processing performance.

Also, the first to the fifth IGMP-snooping switches 56 to 60 receive the multicasting group MAC address and the UDP port number of the terminal from an external broadcasting channel authentication server, generate the multicasting forwarding entry and transmit the contents of the broadcasting channel requested by the terminal using the conventional IGMP.

Meanwhile, to swiftly change the broadcasting channel at the terminal, the first to the third IP multicasting routers 53 to 55 transmit the broadcasting contents received from the Internet broadcasting server 52 to the first to the fifth IGMP-snooping switches 56 to 60 by using the conventional multicasting entry and then, the first to the fifth IGMP-snooping switches 56 to 60 provide the broadcasting contents according to the conventional multicasting entry.

Figure 9:
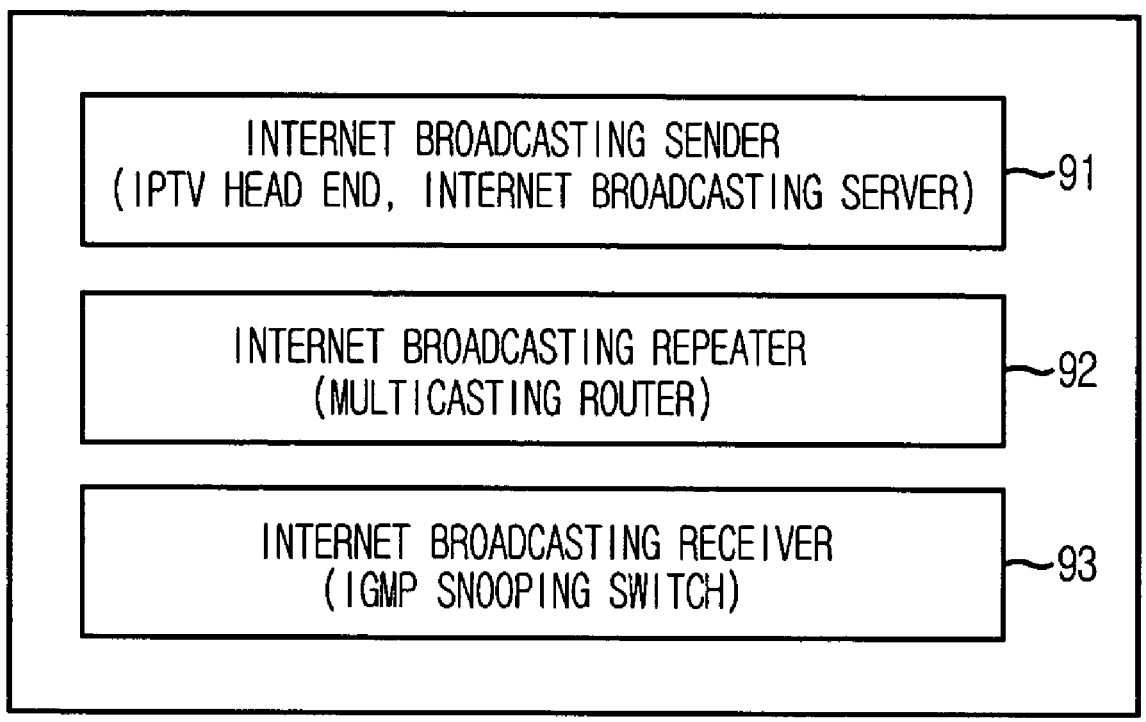
FIG. 9 is an expository diagram showing one exemplary Internet broadcasting system in accordance with the present invention.

FIG. 9 is an expository diagram showing an Internet broadcasting system in accordance with the present invention.

The Internet broadcasting system includes: an Internet broadcasting sender 91; an Internet broadcasting repeater 92; and an Internet broadcasting receiver 93. The Internet broadcasting sender 91 serves a role in sending broadcasting signals of a plurality of channels. The Internet broadcasting repeater 92 includes a plurality of IP multicasting routers for receiving the broadcasting signals from the Internet broadcasting sender 91 and relaying the broadcasting signal of the channel selected by a user terminal to the corresponding user terminal by using a UDP port number. The Internet broadcasting receiver 93 includes a plurality of IGMP-snooping switches for receiving the broadcasting signal from the Internet broadcasting repeater 92 and transmitting the received broadcasting signal to the user terminal. The user terminal receives the broadcasting signal provided from the Internet broadcasting receiver 93 and outputs the received broadcasting signal.

The above described method of the Internet broadcasting system, which is implemented in the form of a program, can be recorded into a computer readable recording medium such as a read-only memory (ROM), a random access memory (RAM), a compact disc (CD)-ROM, a floppy disk, a hard disk, a magnetic disk and so forth. Since the recordation procedure can be easily derivable by those ordinary people skilled in the art, detailed description of such recordation procedure will be omitted.

On the basis of the present invention, there are provided effect on reduced network loads and increased bandwidth by transmitting selectively the broadcasting signal requested by the user terminal through the use of routers and switches for relaying and switching the broadcasting signals to several user terminals.

The present application contains subject matter related to Korean patent application No. 2004-0105043, filed with the Korean Intellectual Property Office on Dec. 13, 2004, the entire contents of which is incorporated herein by reference.

While the present invention has been described with respect to the particular embodiments, it will be apparent to those skilled in the art that various changes and modifications may be made without departing from the scope of the invention as defined in the following claims.

What is claimed is:
1. An Internet broadcasting system, comprising:
  a signal converter for receiving an analog broadcasting signal and converting the analog broadcasting signal into a digital broadcasting data;
  an Internet broadcasting unit for sending the digital broadcasting data after storing the digital broadcasting data;
  a repeater for relaying the digital broadcasting data to a switching unit connected with a user terminal according to a broadcasting request message inputted from the user terminal but selectively relaying a channel selected by the user terminal by referring to a first multicasting forwarding table created by using a user datagram protocol (UDP) port number extracted from the broadcasting request message; and the switching unit for snooping on the broadcasting request message transmitted from the user terminal to the repeater, extracting the UDP port number from the broadcasting request message, storing the extracted UDP port number into a second multicasting forwarding table such that the extracted UDP port number corresponds to information on a location of the user terminal, and transmitting the digital broadcasting data of the selected channel received from the repeater to the corresponding user terminal by referring to an entry of the second multicasting forwarding table.

2. The Internet broadcasting system as recited in claim 1, wherein the broadcasting request message inputted from the user terminal includes:
   a multicasting group media access control (MAC) address;
   a source MAC address;
   a source Internet protocol (IP) address;
   an IP multicasting group address; and
   an UDP port number.

3. The Internet broadcasting system as recited in claim 2, wherein the first multicasting forwarding table includes:
   a multicasting group IP address;
   a UDP port number;
   a physical port number necessary for sending the digital broadcasting data from the Internet broadcasting unit to a user terminal side; and
   a source IP address.

4. The Internet broadcasting system as recited in claim 2, wherein the repeater relays the digital broadcasting data inputted from the Internet broadcasting unit to the switching unit connected to the user terminal according to the broadcasting request message provided from the user terminal but extracts a multicasting group IP address and an UDP port number included in a head of a digital broadcasting data message received from the Internet broadcasting unit, searches for the first multicasting forwarding table and transmits the digital broadcasting data to the switching unit corresponding to an entry of the first multicasting forwarding table coinciding with the extracted multicasting group IP address and the UDP port number.

5. The Internet broadcasting system as recited in claim 1, wherein the second multicasting forwarding table includes:
   a multicasting group MAC address;
   a UDP port number; and
   a physical port number of the switching unit.

6. The Internet broadcasting system as recited in claim 5, wherein the switching unit snoops on the broadcasting request message transmitted from the user terminal to the repeater, extracts the UDP port number included in the broadcasting request message, stores the extracted UDP port number into the second multicasting forwarding table such that the extracted UDP port number corresponds to information on a location of the user terminal, searches for the second multicasting forwarding table based on the multicasting group IP address and the UDP port number included in the digital broadcasting data of the selected channel received from the repeater and transmits the digital broadcasting data to the user terminal corresponding to an entry of the second multicasting forwarding table coinciding with the extracted multicasting group IP address and UDP port number.

7. A method for providing an Internet broadcasting service, comprising the steps of:
   storing a UDP port number extracted from a broadcasting request message inputted from a user terminal into a multicasting forwarding table such that the extracted UDP port number corresponds to information on a location of the user terminal; and
   selectively transmitting a broadcasting data corresponding to a channel selected by the user terminal among broadcasting data of multiple channels received from an external source by referring to the multicasting forwarding table based on the broadcasting request message inputted from the user terminal.

8. The method as recited in claim 7, wherein the broadcasting request message includes:
   a multicasting group MAC address;
   a source MAC address;
   a source IP address;
   an IP multicasting group address; and
   a UDP port number.

9. The method as recited in claim 8, wherein the transmitting of the broadcasting data is carried out by extracting a multicasting group IP address and a UDP port number included in a head of a message of broadcasting data of multiple channels received from the external source, searching for the multicasting forwarding table and selectively transmitting the broadcasting data corresponding to the selected channel by the user terminal among the broadcasting data of the multiple channels to the corresponding user terminal coinciding with the extracted multicasting group IP address and the UDP port number.

* * * * *